United States Patent [19]

Anderson et al.

[11] Patent Number: 5,040,732
[45] Date of Patent: Aug. 20, 1991

[54] PAINT SPRAY GUN

[75] Inventors: Jerry L. Anderson, Perkins; Thomas R. Boyington, Stillwater, both of Okla.

[73] Assignee: Brunswick Corporation, Skokie, Ill.

[21] Appl. No.: 551,920

[22] Filed: Jul. 12, 1990

[51] Int. Cl.$^5$ .......................... B05B 5/025; B05B 7/12
[52] U.S. Cl. .................................. 239/707; 239/708; 239/412; 239/124; 239/266
[58] Field of Search ................ 239/1, 3, 8, 13, 124, 239/695, 696, 704-708, 135, 266, 269, 412

[56] References Cited

U.S. PATENT DOCUMENTS

| | | | |
|---|---|---|---|
| 2,625,590 | 1/1953 | Peeps | 239/707 |
| 2,895,686 | 7/1959 | Peeps | 239/412 |
| 3,296,015 | 1/1967 | Juvinall et al. | 239/707 |
| 3,529,626 | 9/1970 | German | 239/124 |
| 3,774,844 | 11/1973 | Walberg | 239/15 |
| 3,981,447 | 9/1976 | Bachofen et al. | 239/412 |
| 4,106,699 | 8/1978 | Holt | 239/124 |
| 4,368,852 | 1/1983 | Sharp et al. | 239/695 |
| 4,615,485 | 10/1986 | Larson et al. | 239/124 |
| 4,706,885 | 11/1987 | Morin | 239/76 |

FOREIGN PATENT DOCUMENTS

81/02854 10/1981 World Int. Prop. O. .......... 239/695

OTHER PUBLICATIONS

Exhibit A—Binks Manufacturing Company brochure entitled "Binks Automatic Electrostatic Spray Guns/-Model 80 for Non-Circulating Systems (Shown)/-Model 80C for Circulating Systems", (1983).
Exhibit B—a schematic illustration of a Mixing System.
Exhibit C—a schematic illustration of a Mixing System with a Positive Displacement Pump.

*Primary Examiner*—Andres Kashnikow
*Assistant Examiner*—Karen B. Merritt
*Attorney, Agent, or Firm*—Laney, Dougherty, Hessin & Beavers

[57] ABSTRACT

An electrostatic spray gun particularly adapted to the spraying of fast-drying paint mixtures while preventing the polymerization or setting up of the paint mixtures includes a gun body having defined therein a gun inlet for receiving paint, a gun spray orifice, an annular seat surrounding the orifice, and a supply passage communicating the gun inlet and the orifice. The gun also includes a valve assembly including a reciprocable valve member engageable with the valve seat to close the orifice and define a closed position of the valve member. The valve assembly further includes an electrode extending from the valve member through the orifice. The gun further includes an adjustable control structure for moving the value member between its closed position and an open position and for varying a distance between the valve seat and the valve member when the valve member is in its open position so that a resistance to flow through the supply passage is varied and a rate at which paint flows out of the orifice is varied.

4 Claims, 5 Drawing Sheets

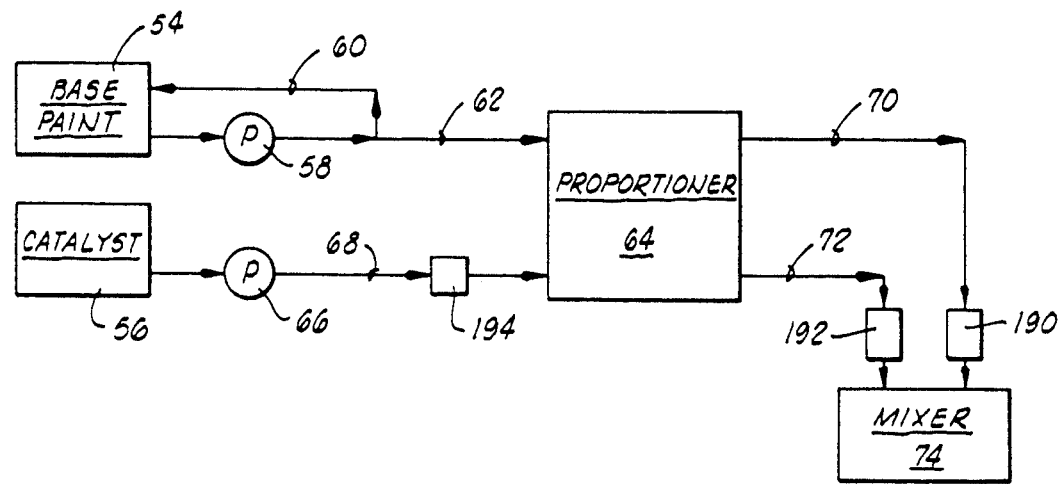
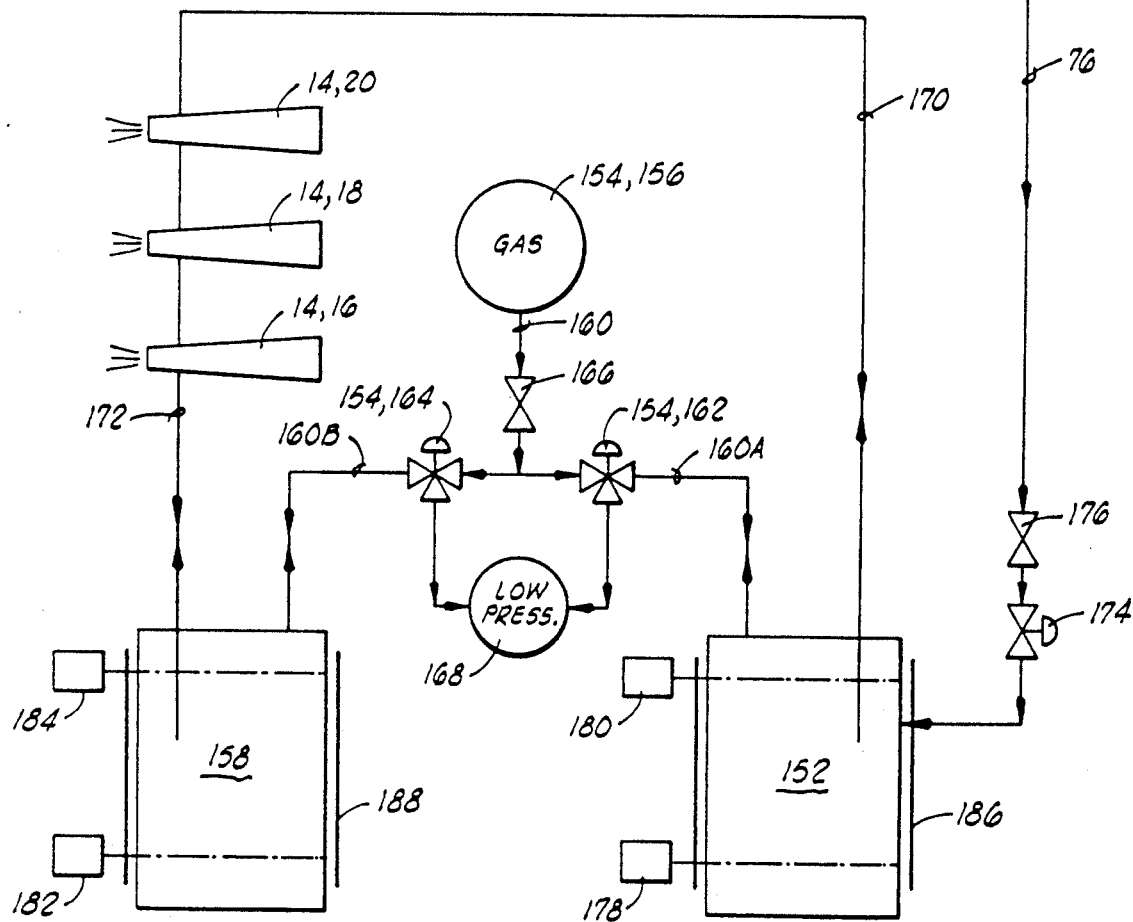
FIG. 3

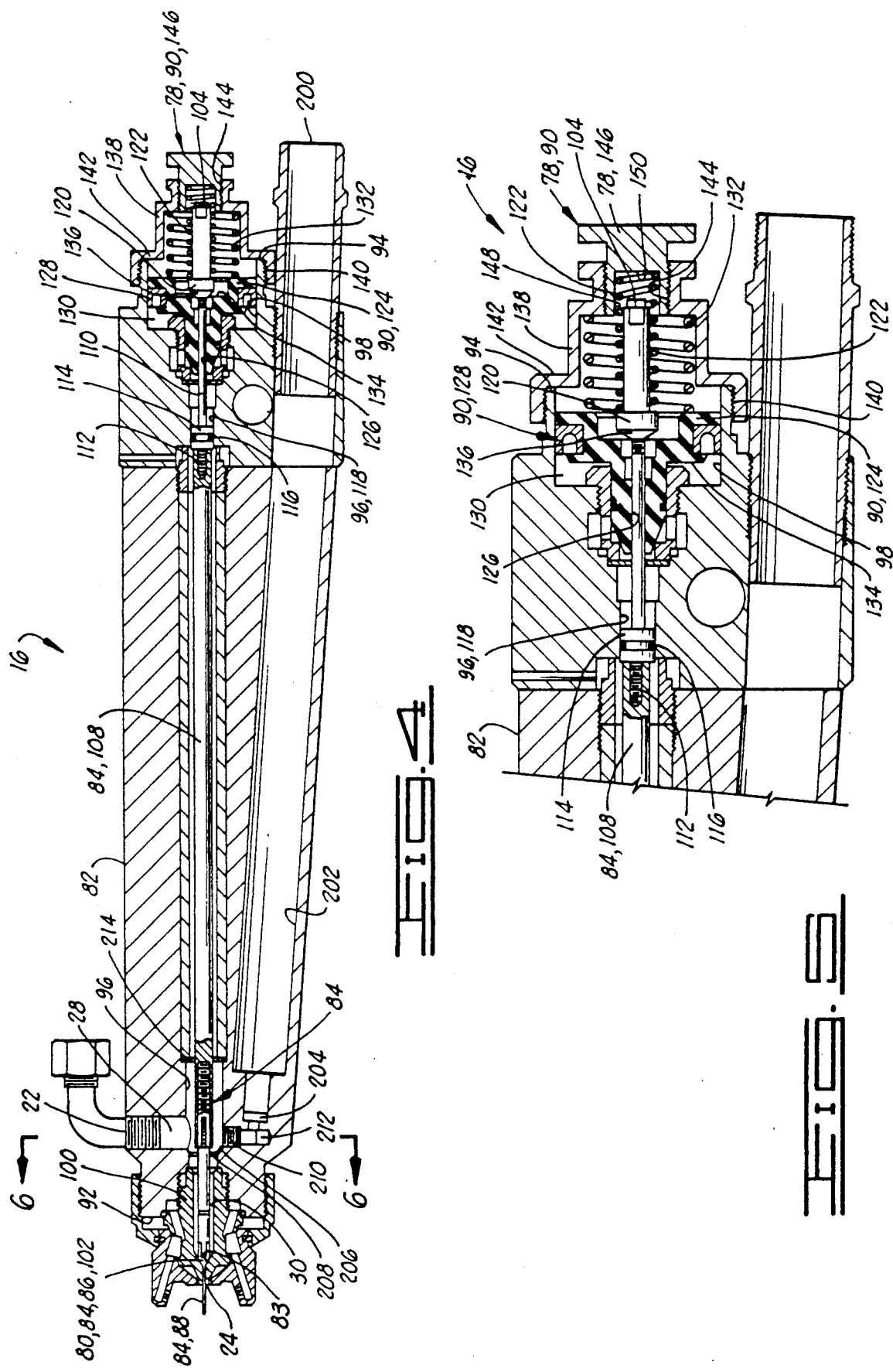

PAINT SPRAY GUN

BACKGROUND OF THE INVENTION

1. Field Of The Invention

The present invention relates generally to paint spraying systems, and more particularly, but not by way of limitation, to an electrostatic spray gun for spraying a quick-drying paint mixture of a base paint and a catalyst.

2. Description Of The Prior Art

Electrostatic paint spray guns are well known. The guns disclosed in the present application are constructed by modifying a prior art gun manufactured by Binks Manufacturing Company of Franklin Park, Illinois, known as its Model 80 or Model 80C electrostatic gun.

Such electrostatic spray guns are known to be usable in the assembly-line painting of articles. These guns have been utilized by the assignee of the present invention in connection with the assembly-line painting of components of marine engines. Until recently, such painting was accomplished with single-part, non-catalyzed paints. The painting system typically included a tank in which the paint was stored and agitated to keep it well mixed, a pump which took paint from the tank and circulated cold paint through a loop returning to the tank and a takeoff line which took paint from the circulating loop and directed it through a line heater to a series of pressure regulators adjacent the inlets of a plurality of spray guns.

The Binks Model 80 spray guns are actuated by applying air pressure to a piston which moves a valve member to open an orifice so that paint can then flow from the pressure regulator to the orifice and out onto the articles to be painted. The amount of paint directed through the gun when the gun is in its open position is controlled by adjusting the pressure regulator. Such systems perform perfectly well when utilizing conventional non-catalyzed paints.

More recently, however, environmental regulations have encouraged the use of quick-drying paints which reduce the amount of pollutants released to the atmosphere. These quick-drying paints comprise a paint mixture made up of a base paint and a catalyst. After the base paint and catalyst are mixed, the paint will polymerize or set up much more quickly than would the previously used conventional paints. When these quick-drying paint mixtures are utilized with a system like that just described, considerably difficulties are encountered with the paint mixture setting up and plugging various components of the system such as the regulators immediately upstream of each of the spray guns.

The prior art also includes systems for mixing these quick-drying paints. The base paint typically is stored in a mixing tank from which it is drawn and circulated through a cold paint loop by a pump. Cold base paint is taken off from the cold paint loop and directed to a proportioner. Simultaneously, catalyst is directed to the proportioner. The proportioner allows both base paint and catalyst to flow in a predetermined proportion to a mixer which mixes the base paint and catalyst to form the quick-drying paint mixture. Heaters may be located in the system upstream of the mixer.

SUMMARY OF THE INVENTION

The present invention provides an electrostatic spray gun particularly adapted to the spraying of fast-drying paint mixtures while preventing the polymerization or setting up of the paint mixtures. The gun includes a gun body having defined therein a gun inlet for receiving paint, a gun spray orifice, an annular seat surrounding the orifice, and a supply passage communicating the gun inlet and the orifice.

The gun also includes a valve assembly including a reciprocable valve member engageable with the valve seat to close the orifice and define a closed position of the valve member. The valve assembly further includes an electrode extending from the valve member through the orifice.

The gun further includes an adjustable control structure for moving the valve member between its closed position and an open position and for varying a distance between the valve seat and the valve member when the valve member is in its open position so that a resistance to flow through the supply passage is varied and a rate at which paint flows out of the orifice is varied.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 3 is a schematic illustration of a third embodiment of the paint system utilizing a pressurized paint pot as the paint source. There are two such paint pots which are alternately used as the paint source, with the other paint pot acting as a reservoir to hold recycled paint mixture.

FIG. 4 is an elevation sectioned view of a paint spray gun having an adjustable limit means for adjusting the opening between the valve member and valve seat.

FIG. 5 is an enlarged view of the right-hand end of FIG. 4 showing in greater detail the structure which permits the adjustment of the opening of the valve member.

DETAILED DESCRIPTION OF THE PREFERRED EMBODIMENTS

Figure 1:
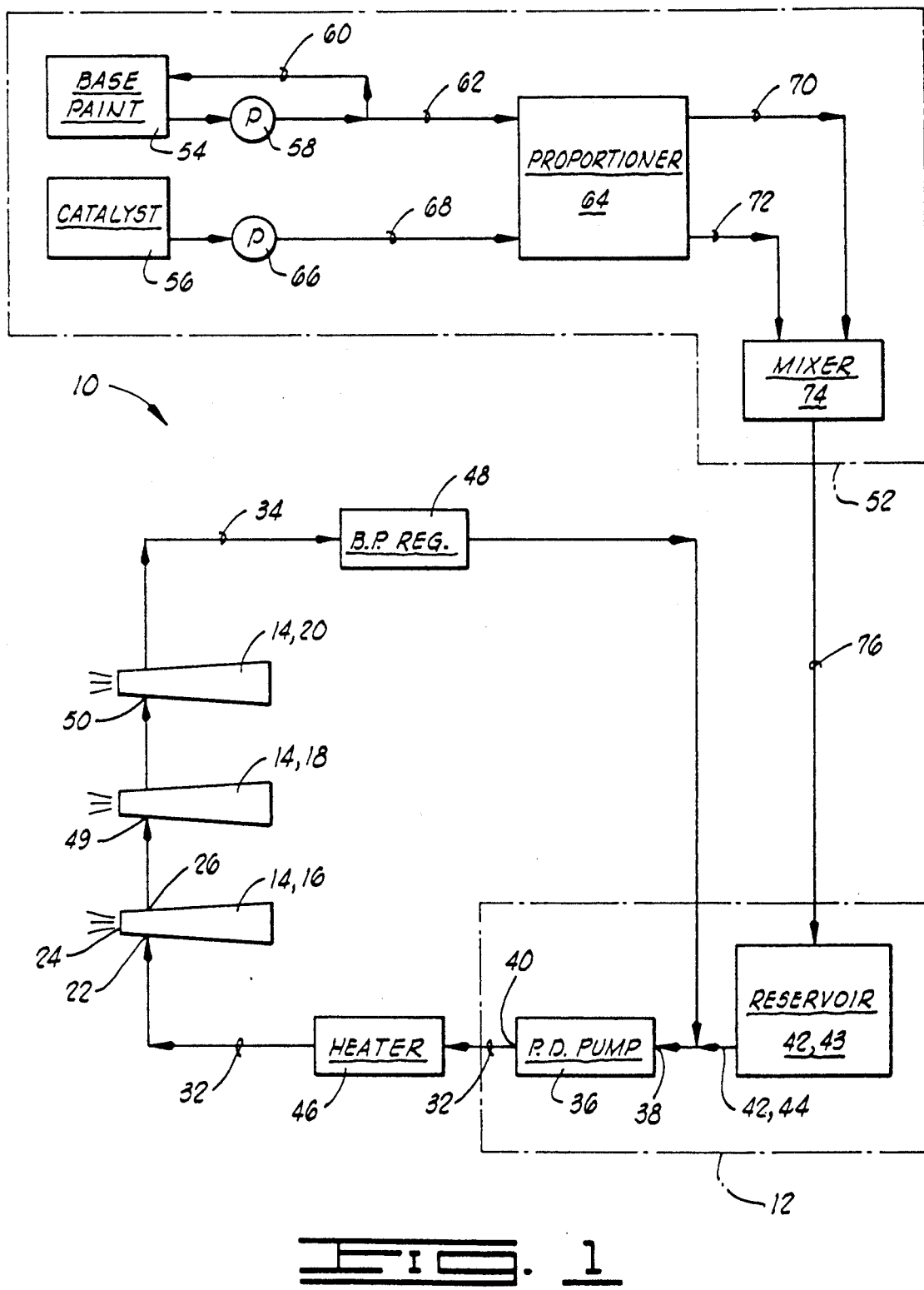
FIG. 1 is a schematic illustration of a first embodiment of the paint spraying system utilizing a positive displacement pump as a pressurized paint source, and having a plurality of spray guns connected in series.

Referring now to the drawings, and particularly to FIG. 1, a paint-spraying system is thereshown and generally designated by the numeral 10. The paint spray system 10 includes a source of pressurized paint generally designated by the components contained within the phantom block designated 12.

A paint spray means 14 includes a plurality of spray guns such as first, second and third spray guns 16, 18 and 20, respectively.

The first spray gun 16 is illustrated in FIGS. 4 through 7. Each gun such as gun 16 includes a gun inlet means 22 for receiving paint, a gun spray outlet means 24 for spraying paint on an article to be painted, a bypass outlet 26, a bypass passage means 28 for bypassing unused paint mixture from the inlet 22 to the bypass outlet 26 and a supply passage means 30 for supplying paint from the inlet 22 to the spray outlet 24.

Returning to FIG. 1, an unregulated paint feed conduit means 32 is provided for feeding paint mixture from the source 12 to the spray guns 16, 18 and 20. Feed conduit means 32 is unregulated in that there are no pressure regulators disposed in feed conduit means 32. The feed conduit means 32 is free of any substantial restriction to flow of paint mixture therethrough.

A paint recycle conduit means 34 is provided for recycling unused paint mixture from the spray guns 16, 18 and 20.

The source of paint 12 illustrated in FIG. 1 includes a positive displacement pump 36 having a suction inlet 38 and a discharge outlet 40. Source 12 also includes a paint supply means 42 for providing paint to the suction inlet 38 of pump 36. The paint supply means 42 includes a reservoir 43 and a suction conduit 44 connecting the reservoir 43 to the suction inlet 38 of pump 36. The paint mixture contained in reservoir 43 may be maintained at atmospheric pressure. Reservoir 43 may include a mechanical mixer (not shown).

It is noted that the pump 36 is preferably a positive displacement pump. When using a positive displacement type of pump for pump 36, it is necessary to have a means for recycling unused paint from the guns 16, 18 and 20, or otherwise it would not be possible to control the flow rates of paint sprayed by each of the guns.

The feed conduit means 32 feeds paint from the discharge outlet 40 of positive displacement pump 36 to the spray guns. A line heater 46 is disposed about feed conduit 32 to heat the paint mixture flowing therethrough.

Paint recycle conduit means 34 is a means for recycling unused paint from the paint spray means 14 to the paint supply means 42, and particularly to the suction conduit 44 of paint supply means 42. Thus, the suction inlet 38 of pump 36 takes in the paint being recycled through recycle conduit means 34, and also takes in any necessary makeup paint from the reservoir 43.

A back pressure regulator 48 is disposed in the recycle conduit means 34 for regulating a back pressure maintained in recycle conduit means 34 against the spray paint means 14. Regulator 48 is preferably placed immediately adjacent the suction conduit 44. Since there is a constant flow of paint mixture through regulator 48 and there are no dead-end paths leading away from regulator 48, no problem of paint mixture setting up in regulator 48 occurs.

In the system illustrated in FIG. 1 the spray guns 16, 18 and 20 are connected in series so that an unused portion of paint mixture bypassed through the first gun 16 is directed to a gun inlet 49 of the second gun 18, and paint mixture bypassed through the second gun 18 is directed to a gun inlet 50 of third gun 20, and so on.

The fast-drying paint mixture is provided to the reservoir 42 from a mixing system indicated within the phantom block designated as 52. The mixing system 52 itself is a part of the prior art. Mixing system 52 includes a source 54 of base paint, and a source 56 of catalyst. A first pump 58 takes base paint from source 54 and circulates it through a loop 60 returning to the source 54. A branch conduit 62 directs base paint from the loop 60 to a proportioner 64.

A second pump 66 takes catalyst from catalyst source 56 and directs it through catalyst conduit 68 to proportioner 64. The proportioner 64 controls the relative proportions of base paint and catalyst flowing therethrough so that the base paint and catalyst exit proportioner 64 through exit conduits 70 and 72, respectively, in the desired proportions. The exit conduits 70 and 72 are connected to a mixer 74 which then mixes the base paint and catalyst to form the quick-drying paint mixture. A primary paint mixture supply line 76 then directs the paint mixture from mixer 74 to reservoir 43.

The details of construction of the spray gun 16 will now be described with reference to FIGS. 4–7.

The gun 16 includes an adjustment means 78 for varying an amount of paint sprayed on the article passing in front of the spray outlet 24. As is further described below, the adjustment means 78 includes an adjustable flow restriction 80 placed in the supply passage 30. The adjustment means 78 of each of the spray guns 16, 18 and 20 is separately adjustable for adjusting an amount of paint mixture sprayed by the gun independently of any adjustment of the other guns.

The spray gun 16 is an electrostatic spray gun and has a gun body generally designated as 82. The gun body has defined therein the previously mentioned gun inlet 22, gun spray outlet or orifice 24, supply passage 30, bypass outlet 26, and bypass passage 28.

The gun body also has defined therein an annular valve seat 83 surrounding the orifice 24.

Figure 6:
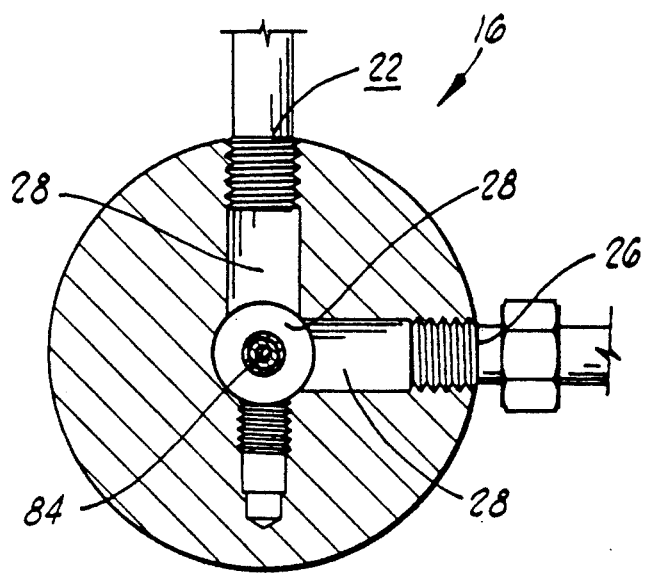
FIG. 6 is a sectioned view taken along line 6—6 of FIG. 4 illustrating the gun inlet and the bypass outlet.
Figure 7:
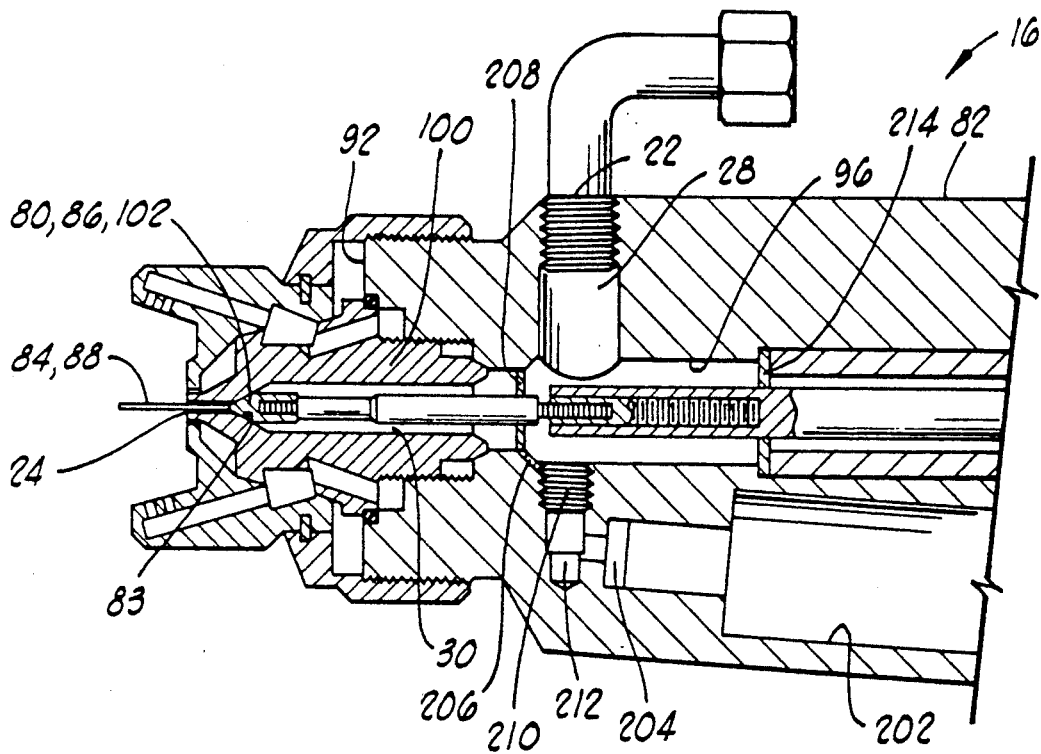
FIG. 7 is an enlarged sectioned view of the left-hand end of the spray gun of FIG. 4.

The gun 16 includes a valve assembly 84 which includes a reciprocable valve member 86 engageable with the valve seat 83 to close the orifice 24 and to thereby define a closed position of the valve member 86. As seen in FIG. 6, the valve assembly 84 extends through the gun bypass passage means 28 so that unused paint mixture continuously flows through the gun bypass passage means 28 past the valve assembly 84.

Valve assembly 84 also includes an electrode 88 extending from the valve member 86 through the orifice 24.

The spray gun 16 further includes an adjustable control means 90 for moving the valve member 86 between its said closed position and an open position and for varying a distance between the valve seat 83 and the valve member 86 when the valve member 86 is in its said open position so that a resistance to flow through supply passage 30 is varied and a rate at which paint flows out the orifice 24 is varied. The adjustment means 78 previously mentioned can be considered to be a part of the adjustable control means 90.

The gun body 82 has a first end or left end 92 as seen in FIG. 4, and a second end or right end 94. Gun body 82 has a central passage 96 defined therethrough from the first end 92 to the second end 94, and has a piston bore 98 defined therein adjacent the second end 94.

A fluid nozzle 100 is connected to the gun body 82 at the first end 92 and has the nozzle orifice 24 defined therethrough and communicated with the central passage 96. The fluid nozzle 100 also has the annular valve seat 83 defined thereon surrounding the orifice 24.

The valve assembly 84, which may be described as an elongated valve assembly 84, is slidably disposed in the central passage 96 and has a first end 102 and a second end 104. The valve member 86 is defined on the first end 102 and is conically shaped and complimentary to the valve seat 83. The valve member 86 is engageable with the valve seat 83 to close the orifice 24.

The valve assembly 84 further includes an intermediate rod 108. A rod extension 110 is threadedly connected to the right-hand end of rod 108 at thread 112. An enlarged portion 114 of rod extension 110 carries an O-ring seal 116 which seals in a reduced diameter portion 118 of central passage 96.

Rod extension 110 has an enlarged shoulder 120 defined thereon. A first coil compression spring biasing means 122 is provided for biasing the elongated valve assembly 84 toward a closed position wherein valve member 86 is engaged with valve seat 83.

The adjustable control means 90 includes an annular control piston 124 slidably disposed in piston bore 98. The piston 124 has a central opening 126 defined therethrough, and has the rod extension 110 of elongated valve assembly 84 slidably received therethrough. The annular piston 124 itself is slidable within piston bore 98 between a first position as illustrated in FIG. 4 corresponding to the closed position of the elongated valve assembly 84, and a second position which will correspond to an open position of the valve assembly 84.

The annular piston 124 includes a packer cup 128 the open side of which faces an air chamber 130 defined within the gun body 82. Compressed air is selectively directed to air chamber 130 so as to act against the control piston 90 and cause it to move from left to right as seen in FIG. 4.

A second coil compression spring biasing means 132 is provided for biasing the control piston 124 to the left in FIG. 4 toward its first position corresponding to the closed position of valve assembly 84.

The piston 124 includes an engagement shoulder or engagement means 134 thereon for engaging a complimentary shoulder 136 of rod extension 110 as the piston 124 moves from left to right in FIG. 4 and for thus moving the elongated valve assembly 84 from its closed position as seen in FIG. 4 to an open position wherein the conical valve member 86 is moved away from valve seat 83.

A threaded bonnet 138 is connected to the gun body 82 at threaded connection 140 and covers the second end 94 of gun body 82.

A fully open position of valve member 84 is determined by abutment of piston 124 with a radial flange 142 of bonnet 138 to define a maximum opening between the conical valve member 86 and the valve seat 83. As further described below, the adjustment means 78 provides a means for selectively limiting travel of the piston 124 and valve assembly 84 short of abutment of the piston 124 with the radial flange 142 of bonnet 138 to define an adjustably reduced opening between the conical valve member 86 and the valve seat 83.

The bonnet 138 has a threaded opening 144 defined therein. The adjustment means 78 is a threaded thimble 146 which is externally threaded and received in the threaded opening 144 of bonnet 138. The adjustment means 78 may be described as an adjustable limit means connected to the bonnet 138 for limiting travel of the elongated valve assembly 84 away from the first end 92 of the gun body 82 and for thus adjustably defining the said open position of the elongated valve assembly 84 and the valve member 86 thereof.

The thimble 146 has a blind bore 148 therein having a bottom 150.

The second end 104 of the elongated valve assembly 84 is loosely received in the blind bore 148 of thimble 146 and is engageable with the bottom 150 of blind bore 148 to limit said travel of said valve assembly 86 away from the first end 92 of the gun body 82.

The previously mentioned first coil spring biasing means 122 has an end thereof received in the blind bore 148 of thimble 146.

When the thimble 146 is backed off to a position such as illustrated in FIG. 5, the actuating piston 124 may move to its fully open position abutting the radial flange 142 of bonnet 138. When it is desired to reduce the space between the valve seat 83 and the valve member 86, the thimble 146 is rotated so as to move into the bonnet 138 thus moving the bottom 150 of blind bore 148 closer to the second end 104 of elongated valve member 84.

For example, with air pressure applied to air chamber 130 so that annular control piston 124 is moved to the right and abutting the radial flange 142 of bonnet 138 so that the valve member 84 is in a fully open position, the thimble 146 may be rotated inwardly until the bottom 150 of blind bore 148 engages the second end 104 of valve assembly 84. Then further inward movement of thimble 146 will cause the valve member 84 and the piston 124 to be moved to the left so that the piston 124 no longer abuts radial flange 142 of bonnet 138. This correspondingly moves the valve member 86 closer to the valve seat 83 thus increasing the restriction to fluid flow through supply passage 30 and thus decreasing the rate at which paint mixture flows out the orifice 24.

The first spring 122 can be referred to as a resilient biasing means 122 for biasing the valve member 86 toward its closed position. The piston 124 may be referred to as an actuating means 124 for moving the valve member 86 against said biasing means 122 toward the open position of the valve member 86.

The radial flange 142 of bonnet 138 may be referred to as a fixed abutment means 142 defined in the gun body 82 for limiting opening movement of the actuating piston 124 and for thus defining the fully open position of the valve member 86. The nozzle orifice 24 should be sized to give the desired fully open flow rate. For example, using a Binks Model 80 spray gun, it has been found to be desirable to use a 0.030" diameter orifice 24.

The thimble 146 and its bottom 150 may be referred to as a limit surface means 150 for abutting the right-hand end 104 of assembly 84 to limit movement of the valve member 86 away from the valve seat 83 and thus define the distance between the valve seat 83 and valve member 86 when the valve member 86 is in its open position. The threaded engagement at threaded opening 144 between thimble 146 and bonnet 138 may be referred to as an adjustment means for adjusting a position of the limit surface means 150 relative to the gun body 82.

The limit surface means 150 and the adjustment thereof provided by threaded engagement of thimble 146 with bonnet 138 may be further characterized as a means for limiting movement of valve member 86 and the actuating piston 124 short of abutment of the actuating piston 124 with the fixed abutment means 142 and for thus defining a variety of less than fully open positions of valve member 86.

As will be understood by those skilled in the art, an electrostatic spray gun like spray gun 16 shown in FIG. 4, will include a high voltage electric cable which is inserted into a cable entrance 200 and placed within a cable passageway 202 through the gun body 82. The electric cable in passageway 202 contacts a stud 204. Stud 204 is in electrical communication with a contact 206 and a resilient spring 208 which contacts the sliding valve assembly 84.

A plug 210 and packing 212 seal the electrical cable passageway 202 from the paint in bypass passage 28.

In the central passageway 96 of gun body 82, a bellows 214 seals a rear side of the bypass passage 28 to prevent paint from passing rearward along the length of valve assembly 84.

Figure 2:
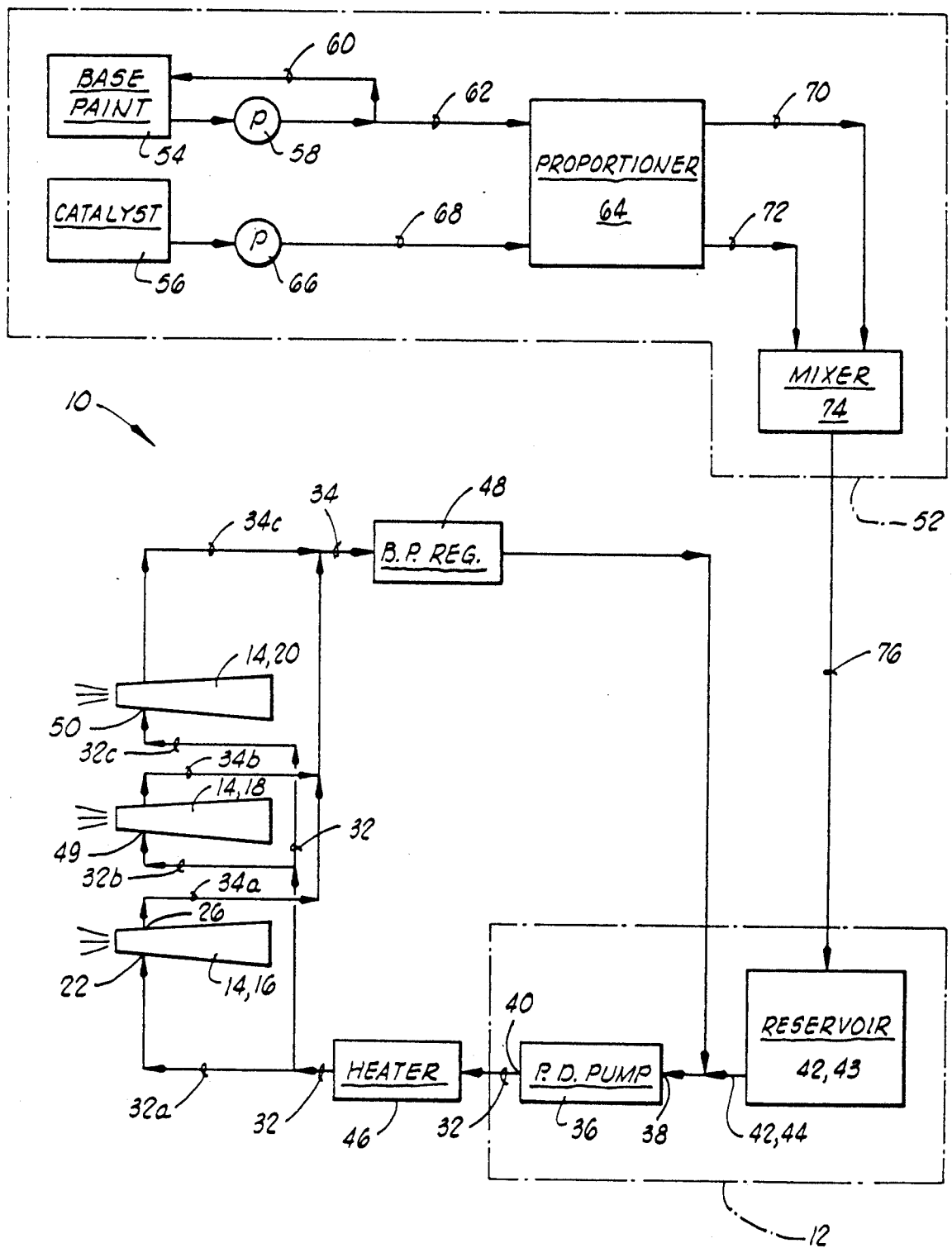
FIG. 2 is a schematic illustration of a second embodiment of the invention similar to that of FIG. 1, but with the spray guns connected in parallel rather than in series.

The Embodiment Of FIG. 2

The embodiment of FIG. 2 is similar to that of FIG. 1, except that the paint mixture supply conduit means 32 and the recycle conduit means 34 have been modified so that the guns 16, 18 and 20 are connected in parallel rather than in series. The supply conduit means 32 includes first, second and third hydraulically parallel portions 32a, 32b and 32c communicated with the inlets 22, 49 and 50 of guns 16, 18 and 20, respectively. Similarly, the recycle conduit 34 includes parallel branches 34a, 34b and 34c communicating the bypass outlets of guns 16, 18 and 20, respectively, with the recycle conduit 34.

The Embodiment Of FIG. 3

In the embodiment of FIG. 3, the atmospheric reservoir 43 and positive displacement pump 36 have been eliminated. Instead, paint is moved past guns 16, 18 and 20 by flowing it from a high pressure reservoir to a low pressure reservoir. Periodically the flow direction will be reversed so that the original high pressure reservoir becomes a low pressure reservoir and vice versa.

In FIG. 3, the primary paint mixture supply line 76 from mixer 74 is connected to a first container or reservoir means 152 for holding paint. A pressurizing means 154 is provided for pressurizing the paint while the paint is contained in the first reservoir means 152. The pressurizing means 154 is a means for supplying pressurized gas from a gas supply 156 to the reservoir 152.

A second reservoir means 158 is also provided for holding paint mixture. The pressurizing means 154 includes a pressurized gas supply line 160 which branches into supply lines 160A and 160B connected to first and second reservoirs 152 and 158, respectively. First and second three-way control valves 162 and 164 are disposed in branches 160A and 160B, respectively. A manual cutoff valve 166 is also disposed in gas supply line 160.

The control valves 162 and 164 provide a means for selectively pressurizing paint mixture in a selected one of the first and second reservoir means 152 and 158. For example, when the system shown in FIG. 3 is started up, high pressure gas from gas supply 156 may be directed to first reservoir 152 through control valve 162. The second reservoir 158 is simultaneously vented to a low pressure zone 168 which may in fact be the atmosphere, or may be some other regulated pressure zone having a pressure lower than that of gas source 156. In this configuration, the high pressure in first reservoir 152 will cause paint mixture to flow out of first reservoir 152 through conduit 170, first to gun 20, then to gun 18, then to gun 16. Unused paint mixture passing through all three guns will then flow through conduit 172 to the second reservoir 158. Thus, in the configuration just described, conduit 170 will function as an unregulated paint feed conduit means 170 and conduit 172 will function as a paint recycle conduit means for recycling unused paint to the second reservoir 158. The control valve 164 functions in the configuration just described as a vent means 164 for selectively venting the second reservoir means 158 to a relatively low pressure.

Subsequently the flow through the system can be reversed by changing the position of control valves 162 and 164 so that high pressure gas from gas source 156 is directed to the second reservoir 158, and so that the first reservoir 152 is vented to the low pressure zone 168. In this configuration, the conduit 172 becomes the unregulated paint feed conduit means supplying paint mixture to the guns, and the conduit 170 serves as the recycle conduit means.

As paint mixture is used up by the guns 16, 18 and 20, additional paint mixture is intermittently supplied from supply line 76 to the first reservoir 152 by the action of a third control valve means 174. A cutoff valve 176 is also disposed in supply line 76.

First reservoir or first container 152 includes a first low level sensing means 178, and a first high level sensor 180. Second reservoir 158 has associated therewith a second low level sensor 182 and a second high level sensor 184. The level sensors 178, 180, 182 and 184 are interconnected with a control system (not shown) which is connected to the control valves 162, 164 and 174 to provide a level sensing and control means to control the flow of paint back and forth between the reservoirs 152 and 158 and to control the flow of makeup paint through primary paint mixture supply line 76 to the first reservoir 152.

When paint is flowing through the primary paint mixture supply line 76 to first reservoir 152, this level sensing and control means, and particularly the first high level sensor 180 will provide a means for stopping flow of paint mixture through the primary paint mixture supply conduit 76 into the first container 152 when the level of paint mixture in the first container 152 reaches the high level associated with sensor 180. A signal generated by sensor 180 will cause the control valve 174 to close when the fluid level within reservoir 152 reaches high level sensor 180. Also, when the level of paint mixture within reservoir 152 reaches high level limit 180, the control system will insure that the direction of flow of paint between reservoirs 152 and 158 is from reservoir 152 to reservoir 158.

Similarly, the low level sensor 178 will cause control valve 174 to open to start the flow of paint mixture from primary supply conduit 76 into the first reservoir 152 when the level of paint mixture in the first reservoir 152 reaches low level 178.

The second high level limit 184 associated with second reservoir 158 will sense when the level of paint mixture in the second reservoir 158 reaches its high level limit and will cause the pressure controllers 162 and 164 to reverse the direction of paint mixture flow so that paint begins to flow from second reservoir 158 to first reservoir 152.

Similarly, if the paint mixture level in second reservoir 158 reaches low level limit 182, the control valves 162 and 164 will be caused to again reverse the direction of flow so that paint begins to flow back from first reservoir 152 again toward second reservoir 158.

The first and second reservoirs 152 and 158 preferably have external tank heaters 186 and 188, respectively, disposed thereabout for heating the paint mixture while it is contained in the containers 152 and 158, respectively.

Also, in the embodiment of FIG. 3, it is desirable that heaters 190 and 192 be placed upstream of mixer 74 in the conduits 70 and 72.

It is also desirable to place a mass flow meter 194 in conduit 68 to measure more exactly the amount of catalyst being directed to proportioner 64.

Methods Of Operation

The methods of spraying quick-drying paint mixtures of a base paint and catalyst represented by the systems of FIGS. 1, 2 and 3 can generally be described as including the following steps.

First, the base paint and catalyst are mixed to form the paint mixture.

A plurality of spray guns are provided, each gun having an inlet 22, a spray outlet 24, and a supply passage 30 between the inlet 22 and outlet 24.

The paint mixture is fed to the spray guns 16, 18 and 20. The amount of paint sprayed by each gun is adjusted independently of the adjustment of any of the other guns.

Unused paint is recycled from the guns through a recycle conduit.

Preferably in this method, each of the guns also includes a bypass passage, and the unused paint is bypassed through the bypass passage of at least one of the guns before it is recycled.

The paint mixture is fed to the inlet 22 of the first gun 16. Unused paint is passed through the bypass passage 28 of the first gun 16 and then on to the inlet 49 of the second gun 18 and so on. The unused paint is finally bypassed through a last one of the guns in the series, and is then recycled.

In the embodiment of FIGS. 1 and 2, the paint mixture is fed to the spray guns from reservoir 43 by pump 36. First the paint mixture is held in reservoir 43. Then the pump 36 draws the paint mixture through suction line 44 to the pump 36. The pump 36 then pumps the paint mixture through conduit 32 to the spray guns. In this embodiment, the recycle conduit 34 recycles unused paint to the suction line 44. The pump 36 draws this recycled paint into its suction inlet 38, and also takes in any necessary makeup paint from the reservoir 43.

It is preferred that the recycled paint all be drawn into the pump 36 because it has already been heated, and thus less additional heating is necessary.

A back pressure in the recycle conduit 34 is controlled by back pressure regulator 48.

In the system just described, the paint mixture is continuously flowed through the bypass passage 28 of each gun past the valve assembly thereby substantially minimizing polymerization or setting up of paint mixture within the gun.

Intermittently, when it is desired to spray paint on an article adjacent the orifice or spray outlet 24, the valve assembly is moved toward a fully open position thereof thus opening a space between the conical valve member 86 and valve seat 83 to permit paint mixture to flow through the supply passage 30 and out the orifice 24 to paint the article.

The size of this spacing between valve member 86 and valve seat 83 can be adjusted to adjust the restriction to fluid flow through supply passage 30 by limiting movement of the valve assembly away from the valve seat 83 short of the fully open position of the valve assembly thereby adjusting the rate at which the paint mixture can be sprayed out the orifice 24.

This adjustment is accomplished with the threaded thimble 146 which can be moved inward to abut the right-hand end 104 of valve assembly 84 to limit movement of the same short of a fully open position.

In the embodiment of FIG. 3, the methods of operation can be described as including steps of holding the paint mixture in a first container such as first reservoir 152, pressurizing the paint mixture while it is in that first container 152, and then flowing the paint mixture from the first container 152 through the conduit 170 to the spray guns 20, 18 and 16. The pressurizing of the container 152 is accomplished with pressurized gas from gas source 156.

With the method of FIG. 3, unused paint is recycled from the guns to the second container or second reservoir 158.

When the second reservoir 158 approaches a full condition, the direction of flow between the first and second reservoirs 152 and 158 is reversed so that paint mixture is fed from the second reservoir 158 to the spray guns with unused paint mixture being recycled back to the first reservoir 152.

Whichever reservoir is being used to receive the recycled unused paint mixture is vented to a low pressure zone 168 to provide the appropriate pressure differential between the two reservoirs.

Intermittently makeup paint mixture is supplied to one of the first and second containers 152 and 158. In FIG. 3 the makeup paint mixture is indicated as being supplied to the first reservoir 152.

Thus it is seen that the apparatus and methods of the present invention readily achieve the ends and advantages mentioned as well as those inherent therein. While certain preferred embodiments of the invention have been illustrated and described for the purposes of the present disclosure, numerous changes in the arrangement and construction of parts and steps may be made by those skilled in the art, which changes are encompassed within the scope and spirit of the present invention as defined by the appended claims.

What is claimed is:

1. An electrostatic paint spray gun, comprising:
   a gun body having a first end and a second end, said body having a central passage defined therethrough from said first end to said second end and having a piston bore defined therein adjacent said second end;
   a fluid nozzle connected to said gun body at said first end and having a nozzle orifice defined therethrough communicated with said central passage, said fluid nozzle having an annular valve seat defined thereon surrounding said orifice;
   an elongated valve assembly slidably disposed in said central passage, said valve assembly having a first end and a second end and including a valve member defined on said first end, said valve member being engageable with said valve seat to close said orifice, and said valve assembly including an electrode extending from said valve member through said orifice;
   first spring biasing means for biasing said elongated valve assembly toward a closed position wherein said valve member is engaged with said valve seat;
   an annular piston slidably disposed in said piston bore, said piston having a central opening defined therethrough and having said elongated valve assembly slidably received therethrough, said piston being slidable within said piston bore between a first position and a second position, said first position corresponding to said closed position of said elongated valve assembly, said piston including engagement means for engaging said elongated valve assembly and moving said elongated valve assembly to an open position as said piston moves from its first position to its second position;

a bonnet connected to said gun body and covering said second end of said gun body;

adjustable limit means connected to said bonnet for limiting travel of said elongated valve assembly away from said first end of said gun body and for thus adjustably defining said open position of said elongated valve assembly;

wherein said second position of said piston in said piston bore is determined by abutment of said piston with said bonnet and defines a maximum opening between said valve member and said valve seat; and wherein said adjustable limit means is further characterized as a means for selectively limiting travel of said valve assembly and said piston short of abutment of said piston with said bonnet to define an adjustably reduced opening between said valve member and said valve seat.

2. The spray gun of claim 1, wherein:
said adjustable limit means is adjustably threadedly connected to said bonnet.

3. The spray gun of claim 1, wherein:
said bonnet has a threaded opening therein;
said adjustable limit means is an externally threaded thimble threadedly received in said threaded opening of said bonnet, said thimble having a blind bore therein, said blind bore having a bottom; and
said second end of said elongated valve assembly is received in said blind bore of said thimble and is engageable with said bottom of said blind bore to limit said travel of said valve assembly away from said first end of said gun body.

4. The spray gun of claim 3, wherein:
said first spring biasing means is a coil spring having an end thereof received in said blind bore of said thimble.

* * * * *